(12) United States Patent
Farrell et al.

(10) Patent No.: US 11,513,383 B2
(45) Date of Patent: Nov. 29, 2022

(54) ELECTRONIC DEVICE DISPLAY ASSEMBLY

(71) Applicant: Apple Inc., Cupertino, CA (US)

(72) Inventors: Lauren M. Farrell, Mountain View, CA (US); Adam T. Garelli, Morgan Hill, CA (US); Brian P. Graves, San Francisco, CA (US); David P. Tarkington, Sunnyvale, CA (US); Eric L. Benson, San Mateo, CA (US); Erik A. Zweigle, San Jose, CA (US); Kwonil D. Fleischman, San Jose, CA (US); Paul X. Wang, Cupertino, CA (US); Simon S. Lee, San Jose, CA (US); Tingjun Xu, San Jose, CA (US); Nicholas A. Rundle, San Jose, CA (US)

(73) Assignee: APPLE INC., Cupertino, CA (US)

( * ) Notice: Subject to any disclaimer, the term of this patent is extended or adjusted under 35 U.S.C. 154(b) by 113 days.

(21) Appl. No.: 17/031,767

(22) Filed: Sep. 24, 2020

(65) Prior Publication Data
US 2022/0091457 A1    Mar. 24, 2022

(51) Int. Cl.
*G02F 1/1333* (2006.01)
*G02B 5/08* (2006.01)
(Continued)

(52) U.S. Cl.
CPC ..... *G02F 1/133308* (2013.01); *G02B 5/0816* (2013.01); *G02B 5/10* (2013.01); *G02B 6/0088* (2013.01); *G02F 1/133331* (2021.01)

(58) Field of Classification Search
CPC ......... G02F 1/133308; G02F 1/133331; G02B 6/0088; G02B 5/0816; G02B 5/10
See application file for complete search history.

(56) References Cited

U.S. PATENT DOCUMENTS 10,761,356 B1    9/2020 Rundle et al.
2006/0262392 A1*  11/2006 Sample .................. G03B 21/56
                                                          359/443
(Continued)

FOREIGN PATENT DOCUMENTS

| CN | 109782467 A |   | 5/2019 |            |
|----|-------------|---|--------|------------|
| JP | 2012059372 A | * | 3/2012 | ......... G02B 6/0031 |
| KR | 20170080284 A | * | 7/2017 |        |

OTHER PUBLICATIONS

JP-2012059372-A machine translation (Year: 2012).*
(Continued)

*Primary Examiner* — Anne M Hines
*Assistant Examiner* — Jose M Diaz
(74) *Attorney, Agent, or Firm* — Dorsey & Whitney LLP

(57) ABSTRACT

An electronic device can include a housing that at least partially defines an exterior surface and an internal volume of the electronic device, and a display assembly at least partially disposed in the internal volume. The display assembly can include a transparent cover that at least partially defines the exterior surface of the electronic device, a backlight unit disposed between the cover and the housing, a frame coupling the cover to the backlight unit, a portion of the frame at least partially defining an aperture, and an electronic component disposed in the internal volume and extending through the aperture.

19 Claims, 11 Drawing Sheets

(51) Int. Cl.
*G02B 5/10* (2006.01)
*F21V 8/00* (2006.01)

(56) References Cited

U.S. PATENT DOCUMENTS

2014/0085563 A1    3/2014   Mathew et al.
2019/0227368 A1*   7/2019   Sim .................... G02F 1/13306

OTHER PUBLICATIONS

KR-20170080284-A machine translation (Year: 2017).*
European Search Report for EP Application No. 21157413, dated Jul. 13, 2021 (19 pp.).

* cited by examiner

ELECTRONIC DEVICE DISPLAY ASSEMBLY

FIELD

The described embodiments relate generally to components for an electronic device. More particularly, the present embodiments relate to components and structures for electronic devices including displays.

BACKGROUND

The components of an electronic device, for example, a housing of an electronic device and associated components, can include structures having features tailored to the specific purposes for which they are employed. The components can be configured to provide physical support or protection to other components of the electronic device, provide for thermal transmission, provide for airflow through or around the electronic device, or provide for any number of additional purposes. The components of the electronic device can be designed to provide a unique and pleasing look and feel for a user. Additionally, the components can be designed to optimize one or more dimensions of the device, such as an amount of an active area of the device.

Recent advances in electronic devices have enabled high levels of performance. Existing components, structures, and methods of assembly for electronic devices, however, can limit the levels of performance of such devices. For example, traditional housings can limit the amount or relative percentage of active area of a display. Similarly, traditional methods of device assembly can include features or components that inhibit device performance, even when non-traditional housing structures are used. Further, traditional structures and methods used to assemble an electronic device can undesirably limit one or more dimensions of the device relative to the individual dimensions of each component. In this regard, further tailoring of components for electronic devices can provide additional or enhanced functionality, desired dimensions, and pleasing aesthetic features.

SUMMARY

According to some aspects of the present disclosure, an electronic device includes a housing that can at least partially define an exterior surface and an internal volume of the electronic device, and a display assembly is at least partially disposed in the internal volume. The display assembly can include a transparent cover that at least partially defines the exterior surface of the electronic device, a backlight unit disposed between the cover and the housing, a frame coupling the cover to the backlight unit, a portion of the frame at least partially defining an aperture, and an electronic component disposed in the internal volume and extending through the aperture.

In some examples, the backlight unit further includes a mounting component coupled to the frame. The frame and the mounting component can define the aperture. The frame can define retention features to receive attachment components passing through apertures defined by the mounting component, the attachment components coupling the mounting component to the frame. The electronic component can include a flexible electrical connector.

In some examples, a surface of the frame that at least partially defines the aperture is angled relative to a portion of the exterior surface defined by the transparent cover. The frame can directly contact the transparent cover. In some examples, the frame can define a notch, with the transparent cover being secured to the frame with an adhesive positioned in the notch. The adhesive can include a reworkable pressure sensitive adhesive.

In some examples, the frame includes a glass-filled polymer. A perimeter shape of the frame can correspond to a perimeter shape of the transparent cover. The frame can include a continuous ring. The frame can at least partially define a seal between the cover and the backlight unit.

According to some examples, an electronic device can include an enclosure at least partially defining an exterior surface and an internal volume of the electronic device, a display assembly at least partially disposed in the internal volume, a support component attached to a surface of the enclosure defining the internal volume, and a retention component attached to the display assembly. The retention component can include a protruding portion that at least partially defines a retention volume and an aperture in communication with the retention volume. The support component can at least partially be disposed in the aperture and can fix the display assembly relative to the enclosure along an axis, or in other words, the support can fix a directional movement of the display assembly relative to the enclosure along an axis or one or more degrees of freedom.

In some examples, the support component can be a first support component and the retention component can be a first retention component. The electronic device can further include a second support component attached to the surface and a second retention component attached to the display assembly, the second support component can be at least partially disposed in an aperture defined by the second retention component. The retention component can be attached to a backlight unit of the display assembly.

According to some examples, an illumination component can include an LED package and a light pipe. The light pipe can define a light receiving surface positioned opposite the LED package and spaced apart therefrom, a light emitting surface can be positioned perpendicular to the light receiving surface, and a reflection surface can be positioned at an acute angle relative to the light receiving surface and the light emitting surface. A multi-layer reflective coating can be deposited on the reflection surface.

In some examples, the multi-layer reflective coating can be formed by a vapor deposition process. The multi-layer reflective coating can include alternating titanium dioxide layers and silicon dioxide layers. The reflective coating can have a thickness of between 1000 nm and 3000 nm. The LED package can be spaced apart from the light receiving surface by between 0.1 mm and 0.2 mm.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
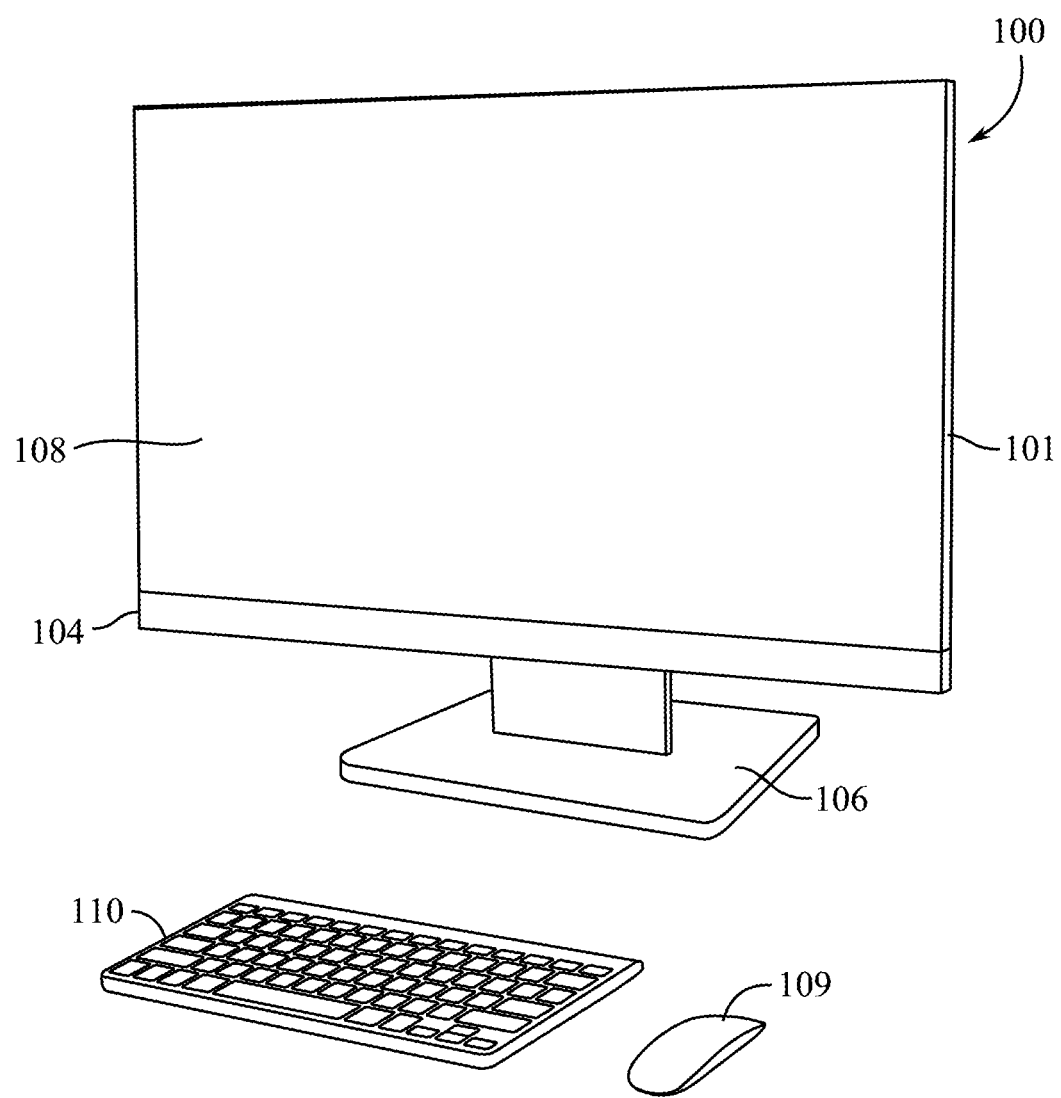
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

The architecture and components of electronic devices, including display portions, described herein, can allow for configurations of an electronic device that can maximize the active area of a display or display cell in a display portion, while still achieving desired levels of functionality. In traditional electronic device configurations, such as with traditionally designed desktops, the display device can include relatively large bezels or borders around most or all of the periphery of the active display cell to hide components for mounting the display cell or display assembly in the display portion housing, for example, components that can fix the directional movement and/or position of the display cell in one or more directions relative to the display housing.

The components, features, and configurations described herein can allow for display device designs that maximize the user-facing active area of the display, while minimizing or even eliminating the bezels adjacent to the display cell, while maintaining the same or even improving levels of display performance. For example, the display portions described herein can have relatively small or even no bezel area around the edges or sides of a display cell, with a relatively small bezel or chin disposed along a bottom edge of the display cell. Such a reduced border configuration can utilize additional unique designs to accommodate for the improved display area. In some examples, internal mounting features are provided to fix the position and limit or fix the directional movement of the display assembly relative to the display housing in one or more directions or degrees of freedom. In some examples, the display portion can include one or more user-facing components, such as a camera indicator light or other illumination component, that can be positioned at an edge of the display, but that may not require a bezel or inactive region that extends across an entire dimension of the display.

One aspect of the present disclosure relates to an electronic device including a housing that defines an exterior surface and an internal volume of the electronic device. The electronic device can include display components positioned partially or entirely within the internal volume. The display components can include a backlight unit positioned in the internal volume and a cover assembly that can include a cover defining an exterior surface of the device. The device can include one or more sealing/attachment features that couple the cover assembly to the backlight unit. The cover assembly can also include a display unit. The backlight unit can define or include one or more retention features that can engage with one or more corresponding engagement features affixed to the housing in the internal volume. A securing component, such as a shaft and a shim, can be disposed between the installed backlight unit and the housing to prevent the backlight unit from moving relative to the housing.

The cover assembly can overlay or overlap the backlight unit. The cover defining the exterior surface, which can be a transparent cover such as glass, sapphire, or plastic, can be attached to the backlight unit, which in turn is fastened or secured to the housing. The cover can further be sealed to the housing along the periphery of the housing by a reworkable pressure sensitive adhesive inserted into a thin gap between the edges of the housing and the cover.

A frame, such as ring including a polymer or polymer-ceramic composite material like glass-filled polycarbonate, can be positioned between the cover and the backlight unit. The frame can extend along a periphery of the cover and/or the backlight unit. In some examples, the frame is a single continuous piece. The frame can be secured to the cover using an adhesive, such as a reworkable pressure sensitive adhesive. In some examples, the frame can at least partially define an aperture sized to allow one or more components to pass there through. In some examples, the frame and a component of the backlight unit are coupled to the frame and define the aperture. In some examples, the aperture can be defined by an angled surface to accommodate an electrical component, such as a flexible electrical connector or flexible printed circuit that extends from the cover assembly to the backlight unit or to other components of the display. The angled surface of the frame can be shaped to conform to a minimum radius that the flexible circuit can bend before becoming damaged. In some examples, a portion of the frame is in direct contact with the cover. The frame can be secured to the cover with an adhesive, the frame defining a notch to receive the adhesive. In some examples, the notch operates as a datum for adhesive. The adhesive can include a reworkable pressure sensitive adhesive.

In some examples, the frame is also attached to the backlight unit with an adhesive. In some examples, the frame is attached to the backlight unit using attachment features, such as screws, snaps, magnets, or latches. The frame can include retention features, such as threaded metal inserts to receive fasteners to secure the backlight unit to the frame. In some examples, the fasteners are threaded directly into the material of the frame. The frame can help to improve the seal between the cover assembly and the backlight unit, for example by preventing the ingress of dust particles or other material that can adversely affect the quality of an image produced by the display.

In some examples, the components and systems described herein can allow for display devices to include narrow bezels or borders surrounding an active area of a display assembly, such as a liquid crystal display (LCD) assembly. These narrow borders do not traditionally provide sufficient material for hardware to engage and retain the components of the device, such as the backlight or cover assembly without the insertion of screws through the rear major surface of the housing or through a sidewall of the housing. The systems and components described herein can facilitate front mounting and secure retention of the display components, while maintaining narrow bezels and borders without the need for additional fasteners.

In some examples, the mounting systems described herein can enable the components of an electronic device, such as display components, circuit boards, fans, and other electronic components, to be disposed adjacent to, or in close proximity to, a major surface of a housing having a structure as described herein. This arrangement of components can aid in maximizing the thermal benefits provided by the housing structure.

Unlike traditional methods of retaining components in an electronic device without passing hardware through major surfaces of the housing, such as gluing components directly to the housing, the present mounting system allows for disassembly of the device without causing undesirable damage to the housing and/or components. Accordingly, electronic devices assembled with the present mounting systems allow for devices to be disassembled, for example, to repair or replace individual components or to recycle or reuse individual components.

In some examples, a display assembly (including the cover assembly and the backlight unit) can be at least partially disposed in the internal volume defined by the housing. The display assembly can, in part, be secured to the enclosure using a reworkable adhesive. Mounting features can be included to ensure proper coupling of the display assembly and the housing. In some examples, one or more support components can be attached to the housing. The support components can engage with one or more retention components that can be attached to a backlight unit of the display. In some examples, the mounting features include support components that are spaced equidistance from a center of the housing and corresponding retention components positioned equidistance from a center of the display unit.

As described, the present systems allow for a display device including narrow bezels surrounding the active area of a display assembly, such as a liquid crystal display (LCD) assembly. These narrow borders do not traditionally provide sufficient space for a notification light or other illumination components, for example, as associated with a camera module. In some examples, the display devices described herein can include a camera and a camera use indicator light. In some examples, to allow for a reduced internal volume of the device, the system includes indicator lights which allow for an LED package to be positioned orthogonal to an output surface of the indicator light.

In some examples, an LED package of the indicator light is positioned above a light pipe or a light guide. The LED package can be oriented such that light is initially emitted parallel to a major surface of the cover, such as a right angle. The light can then enter a light pipe including a reflective angled surface that can reflect the light, such that the light is ultimately emitted in a direction perpendicular to the major surface of the cover glass (i.e., toward the user). A reflective coating can be applied to the angled surface of the light pipe to provide efficient transmission of the light with as little diffusion or loss as possible. In some examples, the LED package emits green light, and the reflective coating includes a plurality of ceramic layers such as titanium dioxide layers and silicon dioxide layers. In some examples, the reflective coating can include between 5 and 50 alternating titanium dioxide and silicon dioxide layers, for example, about 25 alternating titanium dioxide layers and silicon dioxide layers. The reflective coating can have a thickness of between about 1000 nm and about 3000 nm, for example, about 2000 nm or about 2078 nm.

Generally, the devices described herein are used in an upright position. As used herein, an "upright" configuration or position is a configuration in which an elongated height dimension of the device is more parallel than perpendicular relative to the gravitational direction. For example, an electronic device is upright when it is in a vertical orientation similar to a picture frame hanging on a wall or supported by a kickstand. With this understanding, the terms "top," "bottom," "side," "front," "back," "rear," "above," "below," "under" and other such positional terms are to be understood in relation to an upright electronic device, but are used for reference purposed only. For example, a top portion of a device can be located above a bottom portion in some orientations of the device, but can also be located in line with, below, or in other spatial relationships with the bottom portion depending on the orientation of the device. These reference terms are not intended to limit the device to any one orientation and it should be understood that the devices described herein can be used or operated in orientations other than upright. Additionally, the term "length" or "height" refers to a top-to-bottom measurement, the term "width" refers to a side-to-side measurement, and the term "thickness" refers to a front to back measurement.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates a perspective view of an electronic device 100. The electronic device 100 shown in FIG. 1 is a display or a monitor, for example, as can be used with a personal or desktop computer. This is, however, merely one representative example of a device that can be used in conjunction with the ideas disclosed herein. The electronic device 100 can, for example, correspond to a portable media player, a media storage device, a portable digital assistant ("PDA"), a tablet computer, a computer, a mobile communication device, a GPS unit, a remote-control device, or other electronic devices. The electronic device 100 can be referred to as an electronic device, a device, or a consumer device. As shown, the electronic device 100 can include any number of input devices such as a mouse 109, a keyboard 110, a track pad, a stylus, a microphone, or any combination of input devices. The electronic device 100 can include a display 108, a housing 101, a chin 104, and a stand 106. The display 108 can include a computer display such as, for example, a liquid crystal display (LCD), organic light-emitting diode (OLED) display, or any desired display component. The display 108 can be referred to as a monitor, a display screen, or a display assembly of the electronic device 100. The housing 101 can be a shell to protect and cover parts of the display 108. In some examples, the housing 101 can include any desired materials, such as rigid and durable materials. For example, the housing 101 can include plastic, metal, ceramic, glass materials, or combinations thereof. In some examples, the housing 101 can include aluminum. In some examples, the housing 101 can define a bezel (i.e., a front-facing surface of the housing) extending around a perimeter of the display 108. In some examples, the housing 101 defines no bezel or chin 104 (i.e., the electronic device includes a full glass front). Further details of the electronic device 100 are provided below with reference to FIG. 2.

Figure 2:
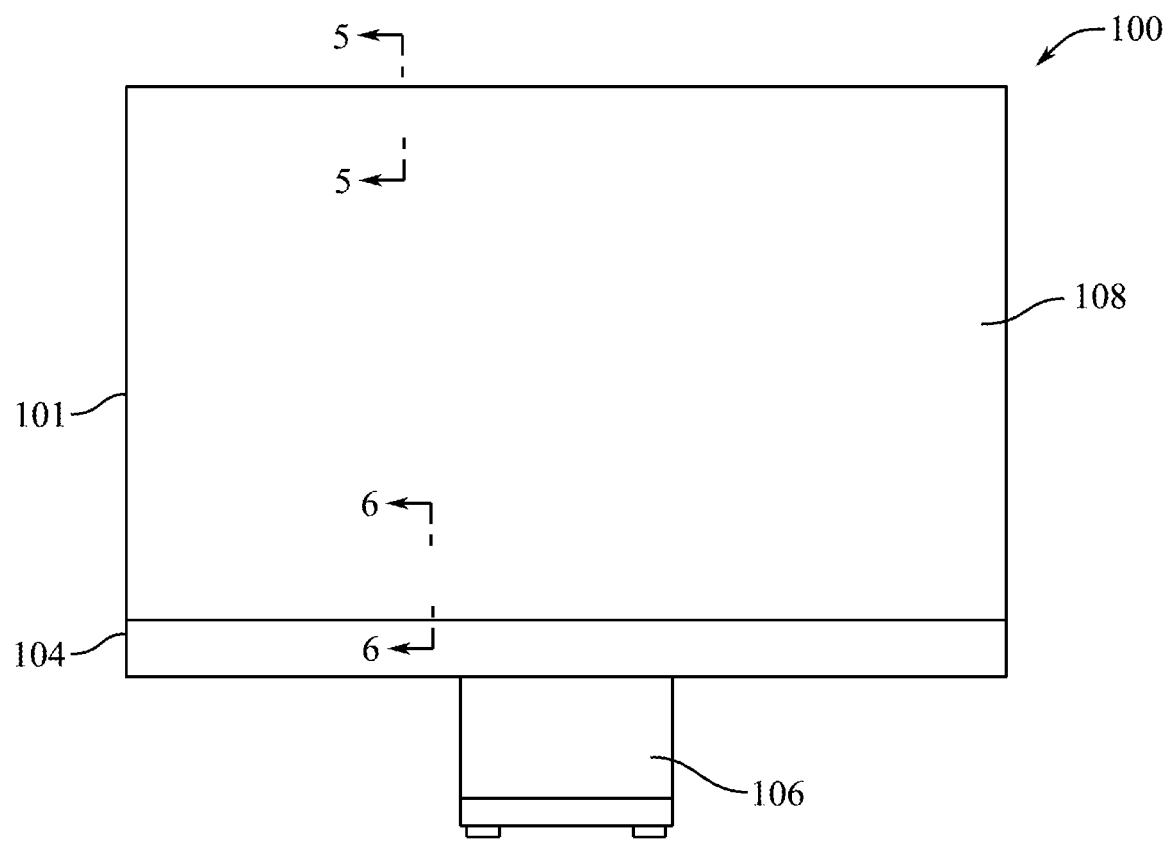
FIG. 2 shows a front view of the electronic device of FIG. 1.

FIG. 2 illustrates a front view of the electronic device 100. As shown in FIG. 2, the display 108 of the electronic device 100 can extend to the outer edge perimeter of the housing 101. The housing 101 can define an aperture, or can be an open-ended enclosure wherein the display 108 is positioned within the aperture to define an internal volume within the housing 101. The chin 104, can also be affixed to the housing 101 to define, at least in part, the internal volume. In some examples, the chin 104 can be integrally formed with the housing 101. The chin 104 can be adjacent to, and can be flush with, an exterior surface defined by the display 108. The chin 104 can contain internal electrical components. In some examples, the display 108 may not extend beyond or overlap with the chin 104, which can provide additional space in the internal volume of the device 100 when the chin 104 is thinner than the display 108. Thus, the internal volume defined between the chin 104 and the housing 101 can be used for larger internal components that may not otherwise fit between a rear surface of the display 108 and the housing 101. In some examples, the thickness of the housing 101 and the display 108 can be approximately equal to the thickness of the chin 104 and the housing 101 when the electronic device 100 is assembled. Accordingly, in some examples, the device 100 can have a substantially constant thickness along one or both of its width and height. In some examples, the display 108 is at least partially supported by the chin 104. In some examples, the display 108 extends fully to the bottom edge of the housing 101 (i.e., there is no chin 104). Further details of the electronic device 100 are provided below with reference to FIG. 3.

Figure 3:
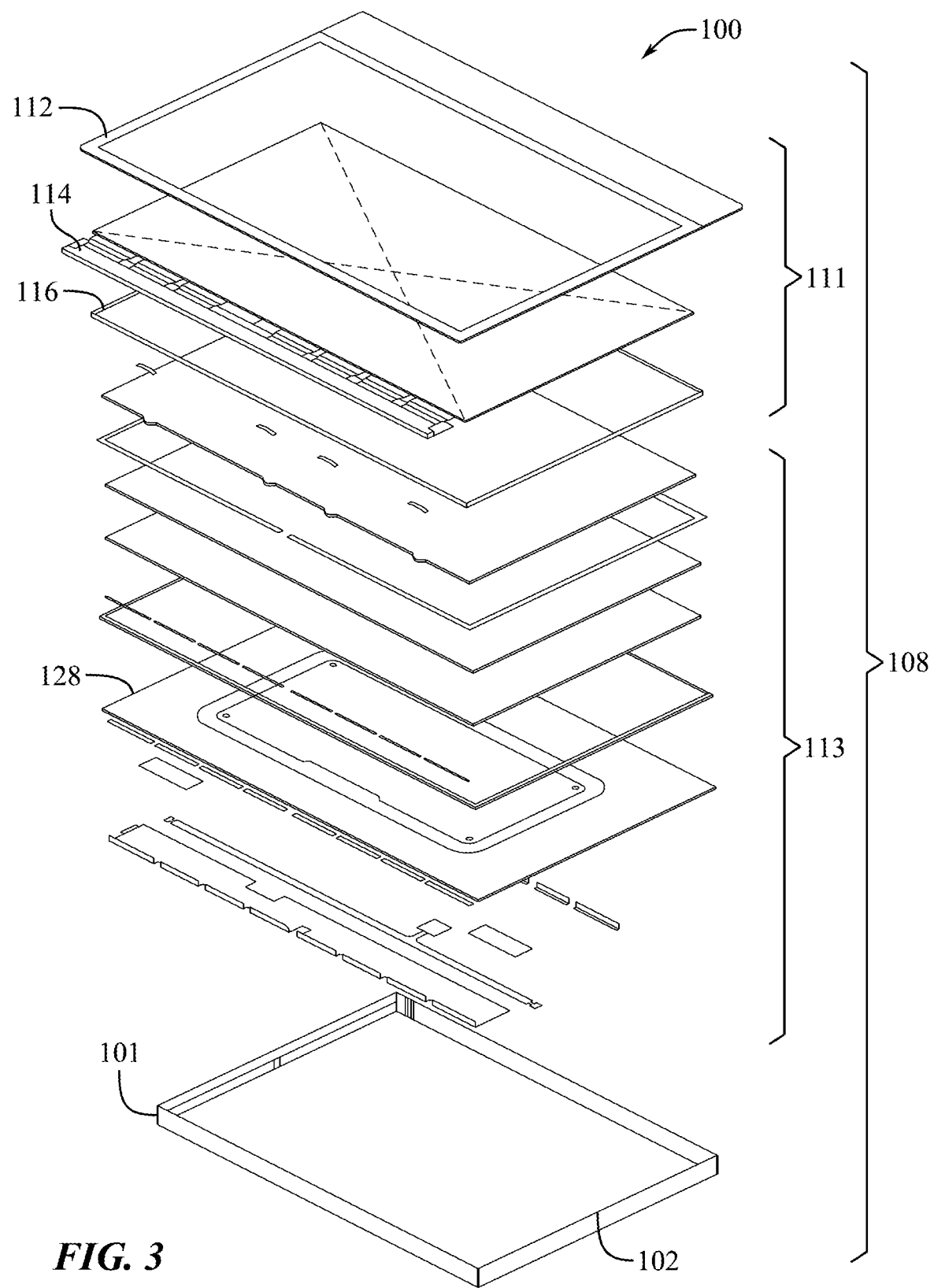
FIG. 3 shows an exploded view of the electronic device of FIG. 1.

FIG. 3 illustrates a perspective exploded view of the electronic device 100. The electronic device 100 can include a housing 101 at least partially defining an exterior surface and an internal volume of the device. In some examples, the housing can include a portion or region that can define a first surface and a second surface. In some examples, the display assembly 108 includes a cover assembly 111 and a backlight unit 113. The backlight unit 113 can be positioned between a major surface of the housing 101 and the cover assembly 111.

Although illustrated as a backlight unit 113, the electronic device 100 can include substantially any desired display or device component. The backlight unit 113 can include a backplate 128 that can be disposed adjacent to a major surface of the housing 101 at least partially defining the internal volume. In some examples, the backplate 128 can assist in conducting heat generated by components of the device 100 to the housing 101, where the housing structure can further aid in removing the heat from the device 100, for example, via convection. Thus, the backplate 128 can include a relatively thermally conductive material, such as a metal, for example, alloys of steel, aluminum, copper, and other metals. In some other examples, however, the backplate 128 can include metal, ceramic, polymer, or combinations thereof. In some examples, engagement features (not shown) can secure the backplate 128 to the housing 101 and can further seal the backplate 128 and the housing 101, for example, through apertures in the backplate 128. Although referred to separately as a housing 101 and a backplate 128, in some examples, the housing 101 and the backplate 128 are referred to together as a housing.

In some examples, the backlight unit 113 can include internal components, such as one or more light emitting diodes (LEDs), cavity reflectors associated with the LEDs, internal posts that can define a thickness of the backlight unit 113, and printed circuit boards, as described herein. A portion of the backlight unit 113, such as a rear major surface thereof, can define one or more retention features that correspond to and can engage with the engagement features protruding from the backplate 128.

The backlight unit 113 can be relatively heavy compared to other components of the device 100, so multiple securing and retention features can be used to secure the backlight unit 113 to both the cover assembly 111 and the housing 101 to evenly support the weight of the cover assembly 111 and/or the backlight unit 113 over a large area of the housing 101. Further, the design of the housing 101, the backplate 128, and the retention features can allow for intimate thermal contact between components of the backlight unit 113 and the backplate 128, thereby providing for increased thermal conduction and improved device cooling. During assembly, the backlight unit 113 can be inserted into the internal volume so that support components or features attached to the housing 101 can pass into the retention features to provide mechanical support to the backlight unit 113 and to fix the backlight unit 113 relative to the housing 101 along one or more axes. As the backlight unit 113 can be securely connected to the housing 101 via the retention features, the number of additional features or securing components disposed around a periphery of the backlight unit 113 can be reduced, thereby allowing the backlight unit 113 to extend substantially an entire height and/or width of the internal volume, and providing a desired level of lighting to any display unit positioned thereover.

The cover assembly 111 can include a transparent cover 112, which can at least partially define an exterior surface of the device 100. Together, the housing 101 and the cover 112 can substantially define the exterior surface and/or the internal volume of the device 100. The cover 112 can include any desired transparent material, for example, glass, plastic, sapphire, other transparent materials, or combinations thereof. In some examples, a display unit 114 can be adhered to the cover 112, for example, to a surface of the cover 112 opposite the portion defining the exterior surface of the device 100. In some examples, the display unit 114 can be an LCD unit, although in other examples any form of display unit 114 can be used as desired, such as an LED display unit, OLED display unit, plasma display unit, quantum dot display unit, other display units, or combinations thereof. The display unit 114 can be affixed to the cover by gluing, adhering, or any other desired securing technique. Further, in some examples, the cover 112 can cover additional components such as a camera, or a touch sensitive surface such as a touchscreen. In some examples, the display unit 114 can include one or more electronic components, such as printed circuit boards including processors, memory, and other electrical components.

The cover 112 can be fastened to the backlight unit 113, for example, through a frame 116 disposed along a periphery of the cover 112 and/or backlight unit 113, as described further herein. Any number of additional internal components can be disposed between the housing 101 and the cover 112. For instance, the device 100 can also include internal components such as processors, memory, circuit boards, batteries, fans, sensors, and other electronic components. Such components can be disposed within the internal volume defined at least partially by the housing 101 and the cover 112, and can be affixed to the housing 101 via internal surfaces, attachment features, threaded connectors, studs, or posts that are formed into, defined by, or otherwise part of the housing 101 and/or the cover assembly 111. Additional features of the electronic device 100 are provided below with reference to FIG. 4.

Figure 4:
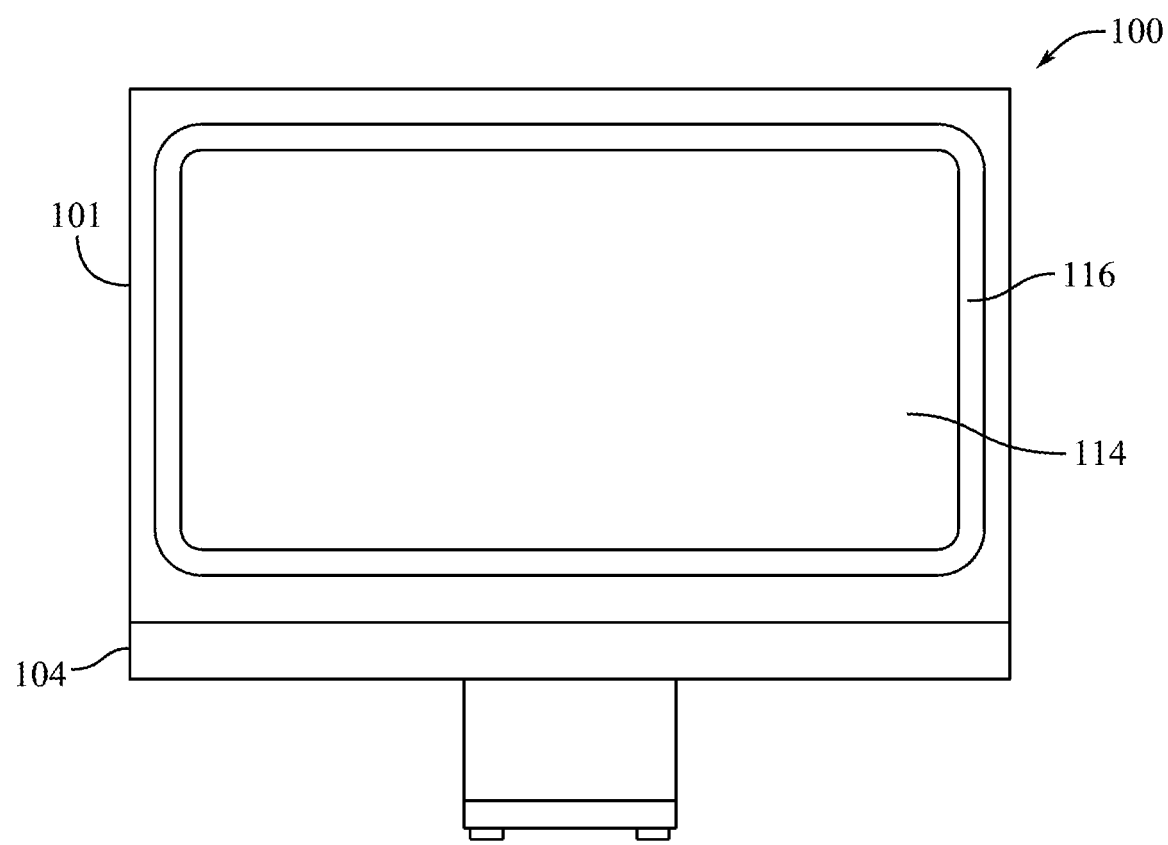
FIG. 4 shows a front view of a select number of components of the electronic device of FIG. 1.

FIG. 4 shows a front view of the electronic device 100 in a partially assembled state with the cover 112 removed. As shown, the frame 116 can extend around a periphery of the cover assembly 111 and/or the backlight unit 113. In some examples, the frame 116 can have a peripheral shape corresponding to a peripheral shape of the cover assembly 111, the backlight unit 113, and/or the housing 101. In some examples, the frame 116 can extend around substantially an entire periphery of the cover 112, the backlight unit 113, and/or the housing 101. In some examples, the frame 116 can be positioned between an edge or a side of the display unit 114 and an edge or side of the housing 101. In some examples, the frame 116 can include multiple members, portions, or pieces that can be joined or formed together to form the frame 116. In some examples, the frame 116 can include a single continuous piece or portion, for example, having a ring shape. In some examples where the frame 116 is a single continuous piece, portions or regions of the frame 116 can still be referred to as members or sidewalls. In some examples, such as where the frame 116 has a ring shape, the frame 116 can define a main aperture or opening. In some examples, the frame 116 can include a metal, a polymer, a ceramic, or combinations thereof. In some examples, the frame 116 can include a polymer such as polycarbonate. In some examples, the frame 116 can include a polymer-ceramic or polymer-metal composite material, such as a glass-filled polymer material. In some examples, the frame 116 can include a glass-filled polycarbonate material. Further details and features of the electronic device 101 are provided below with reference to FIG. 5.

Figure 5:
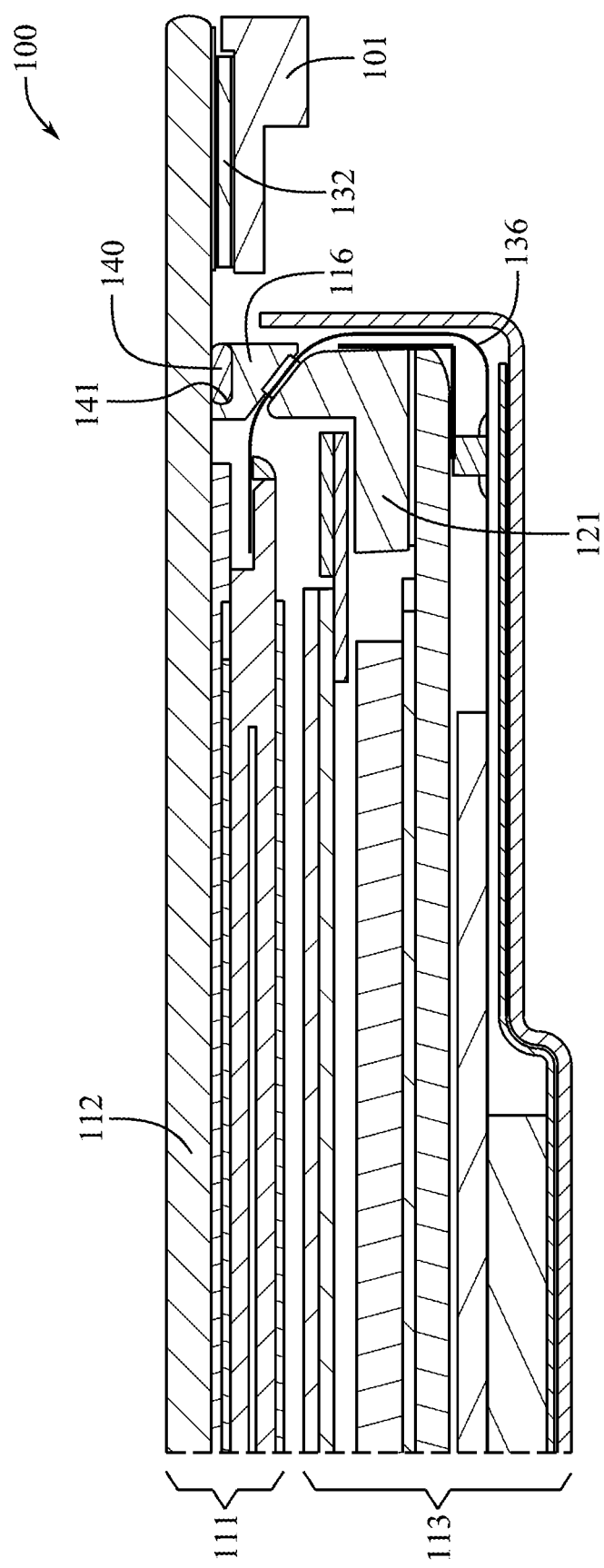
FIG. 5 shows a cross-sectional side view of a portion of an electronic device.

FIG. 5 illustrates a cross-sectional side view of a portion of the electronic device 100 taken along the line 5-5 shown in FIG. 2. In some examples, the cover assembly 111 and the backlight unit 113 are joined, coupled, or otherwise secured together by the frame 116. The frame 116 can be a plastic frame with a periphery that extends around the backlight unit 113. In some examples, the frame 116 includes glass-filled polycarbonate. The frame 116 can be a single unitary piece and can improve a dust seal of the device 100. The frame 116 can be directly or indirectly attach to the cover 112 using adhesive 140. The adhesive 140 can be moldable and can be, for example, a hot melt glue. In some examples, a portion of the frame 116 is in direct contact with the cover 112. In some examples, the frame 116 defines a notch, step, or cavity 141 adjacent the cover 112. The notch 141 can receive the adhesive 140 to secure the frame 116 to the cover 112. The notch 141 can also serve as a datum to fix the position of the frame 116 relative to the cover 112 in one or more dimensions. In some examples, this datum configuration can allow for a desired amount of adhesive 140 to be applied between the frame 116 and the cover 112 (i.e., to ensure enough of the adhesive 140 is applied to provide proper coupling and also to prevent too much adhesive 140 from being applied that could occupy undesirable locations within the device 100). The notch 141 can be between about 0.1 mm wide and about 5 mm wide, or between about 0.5 mm wide and about 2 mm wide, for example about 1 mm wide. In some examples, the notch 141 can be between about 0.1 mm thick and about 2 mm thick, or between about 0.2 mm thick and about 1 mm thick, for example about 0.4 mm thick. There can be multiple notches 141 in the frame 116, for example, corresponding to multiple adhesive locations. In some examples, the notch 141 extends an entire periphery of the frame 116. In some examples, the adhesive 140 can be in the form of a bead of adhesive material and can be positioned substantially entirely around a perimeter of the frame 116 prior to its affixation to the cover 112. The adhesive 140 can serve to further reinforce or define a seal at those locations to which it is provided, for example, to enable an air or water tight seal, and/or a dust-proof or dust-resistant seal while still allowing for a desired level of ease of removal of components from the device, such as the cover 112.

In some examples, the frame 116 can at least partially define one or more component apertures to allow a component, such as a flexible component, including a flexible printed circuit or flexible electrical connector 136 to pass from the cover assembly 111 and/or the backlight unit 113 through an aperture and to one or more components in the internal volume of the device 100. As described herein, the frame 116 can be attached or secured to a mounting component 121 of the backlight unit 113. Accordingly, in some examples, the mounting component 121 can also at least partially define one or more component apertures to allow a component, such as a flexible component, including a flexible printed circuit or flexible electrical connector 136 to pass from the cover assembly 111 and/or the backlight unit 113 through an aperture and to one or more components in the internal volume of the device 100. In some examples, the frame 116 and the mounting component 121 can define one or more apertures.

In some examples, a portion of the frame 116, such as the portion defining the one or more component apertures, can define an angled or curved surface to allow a component, such as a flexible component, including a flexible printed circuit or flexible electrical connector 136 to pass from the cover assembly 111 and the backlight unit 113 and to further allow for reduced borders of the electronic device 100. The flexible component 136 can have a minimum bend radius that it can deform or bend to. Thus, in order to allow for a more gradual bend in the flexible circuit 136 while still reducing the borders of the device, the frame 116 can define an angled or curved surface to allow the flexible circuit 136 to begin bending before clearing the frame 116. Likewise, a portion of the mounting component 121 defining one or more component apertures can be shaped to define a surface with a corresponding angle that coincides with the angle of the frame 116. In some examples, the surface defined by the frame 116 can be angled at about 45 degrees. It will be noted, in other locations, the frame 116 can have a substantially flat or planar geometry. That is, the frame 116 can be angled at locations where a flexible component 136 is passing (i.e., the remainder of the frame 116 can be flat on its sides). In some examples, the electronic device 100 includes a touch sensitive layer (not shown) which can at least partially pass between the one or more apertures defined by the frame 116 and/or the mounting component 121 of the backlight assembly 113.

In some examples, the cover 112 is secured to the housing 101 using adhesive 132. In some examples, the adhesive 132 and/or any of the other adhesives described herein, such as adhesive 140 described above, can include a reworkable adhesive. In some examples, this adhesive 132 can be a reworkable pressure sensitive adhesive, such as a reactive hot melt pressure sensitive adhesive. Further, the adhesive 132 can be applied as a single component material in a warm or heated state, whereupon it can subsequently cool and/or react with ambient moisture to fix the cover 112 to the housing 101. In some examples, the adhesive 132 can include a polymer or polymers capable of one or more forms of cross-linking, and in a cooled state can include a cross-linked urethane polymer network. In some examples, the adhesive 132 can include polyurethane. The adhesive 132 can adhere to the materials of the cover 112 and the housing 101, including metals such as aluminum or stainless steel, ceramics such as glass, and plastics. In some examples, the adhesive 132 can be in the form of a bead of adhesive material, and can be positioned substantially entirely around a perimeter of the cover 112 and/or the housing 101.

In some examples, the adhesive 140 can be substantially similar to adhesive 132, for examples, both adhesives 132, 140 can be reworkable. In some examples, the reworkable nature of the adhesives 132, 140 allows the adhesives 132, 140 to be reheated and removed as a substantially unitary component from the device 100 if disassembly of the device 100 is desired. For example, to facilitate cleaning, repair, or recycling of one or more components of the device 100, one or more of the adhesives 132, 140 can be removed to access the internal components of the device 100. Accordingly, in some examples, the temperature range to release the reworkable adhesives 132, 140 can be greater than a temperature of the adhesive location during regular operation of the device 100, but less than a temperature that would damage the components adjacent to the adhesives 132, 140. In some examples, the adhesives 132, 140 can be substantially chemically or environmentally inert, can be opaque or non-transparent, and can have a color, such as matte black. Further details of the electronic device 100 are described below with reference to FIG. 6.

Figure 6:
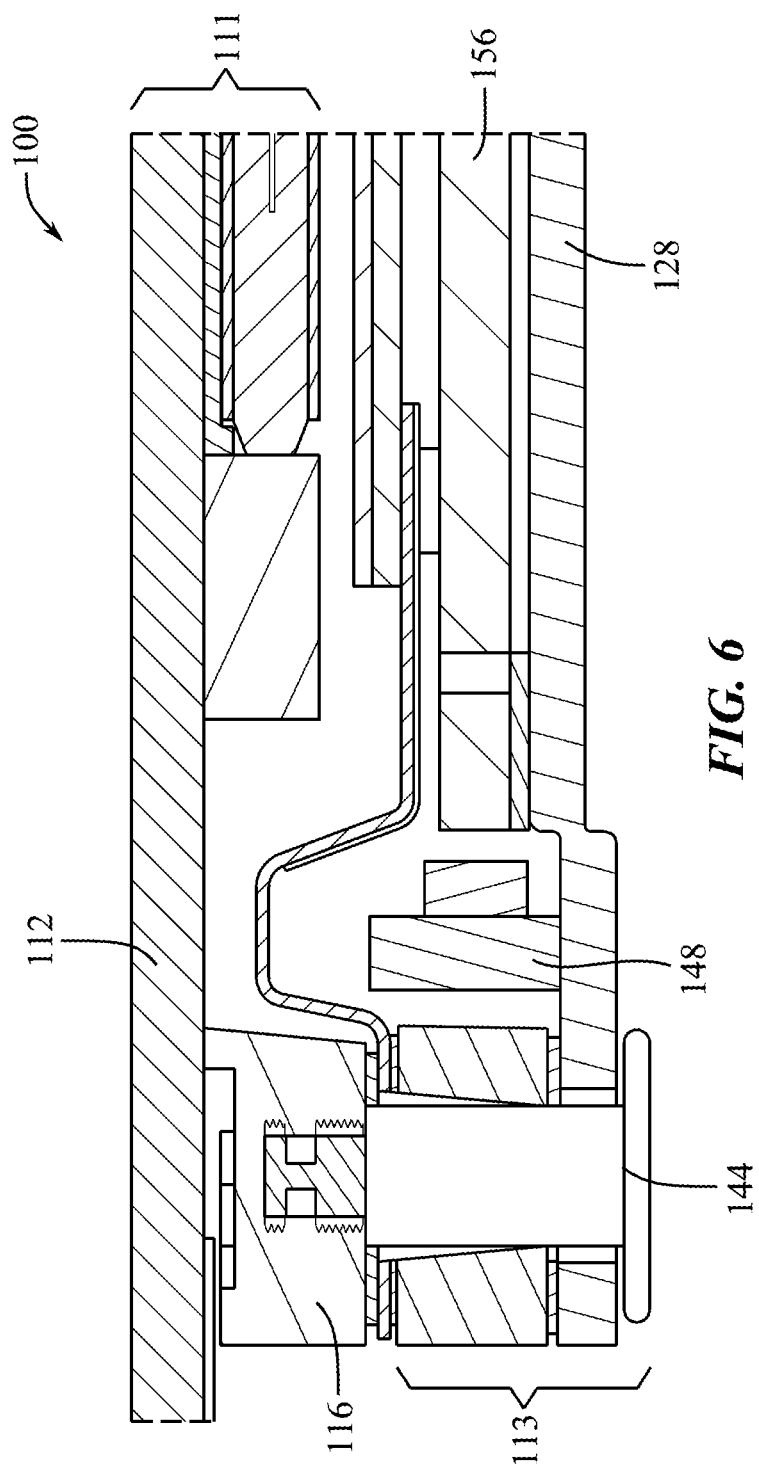
FIG. 6 shows a cross-sectional side view of a portion of an electronic device.

FIG. 6 illustrates a cross-sectional side view of a portion of the electronic device 100. With reference to FIG. 2, the view depicted in FIG. 6 can represent a lower or bottom region of the electronic device 100, although in some examples the components described with respect to FIG. 6 can be located at any position in the device 100. As discussed above, with reference to FIG. 5, the cover assembly 111 and the backlight unit 113 can be attached by the frame 116. Specifically, the frame 116 can be glued to the cover 112 with adhesive 140 (not shown in FIG. 6). Further, the frame 116 can be attached to the backlight unit 113 using attachment components 144, such as fasteners, magnets, latches, snaps, etc. In some examples, the attachment components 144 are threaded screws that are inserted through an aperture in the backplate 128 and are then removably threaded into one or more retention features defined by the frame 116. In some examples, the frame 116 is attached to the backplate 128 with a plurality of attachment features or components 144. For example, there can be four attachment components 144, each corresponding to a side or a corner of the device 100. In some examples, the frame 116 is insert molded around retention components, such as threaded metal inserts configured to receive the fasteners 144. In some examples, the frame 116 is secured to the backlight unit 113 with adhesive, such as the reworkable adhesives discussed herein. It will be understood that with the frame 116 glued to the cover 112, and the frame 116 further fastened to the backlight unit 113, the cover assembly 111 and the backlight unit 113 are coupled to each other.

In some examples, the backlight unit 113 includes a light bar 148, such as an LED bar, to emit light into a light guide plate 156. In some examples, the light bar 148 includes an aluminum printed circuit board. In some examples, the light bar 148 can be welded to the backplate 128. For instance, the aluminum of the light bar 148 can be laser welded to the aluminum of the backplate 128. By welding the light bar 148 to the backplate 128, the light bar 148 is able to better dissipate heat because the weld creates an efficient thermal induction pathway into the backplate 128. Thus, in some examples, there is no need for air flow over the light bar 148. Further, in some examples, there can be a plurality of light bars welded to the backplate 128. By welding the light bars to the backplate 128 instead of using fasteners or other traditional attachment techniques, the number of light bars can be increased without increasing the need for additional cooling of the backlight unit 113.

By implementing one or more of the above configurations, the border of the device 100 can advantageously be reduced. In some examples, the border can be removed entirely and the entire front of the device 100 can consist of the cover 112. Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding engagement and retention features, can apply not only to the specific examples discussed herein, but to any number of embodiments in any combination. Various embodiments of electronic devices including components having various features in various arrangements are described below, with reference to FIGS. 7A-9.

Figure 7A:
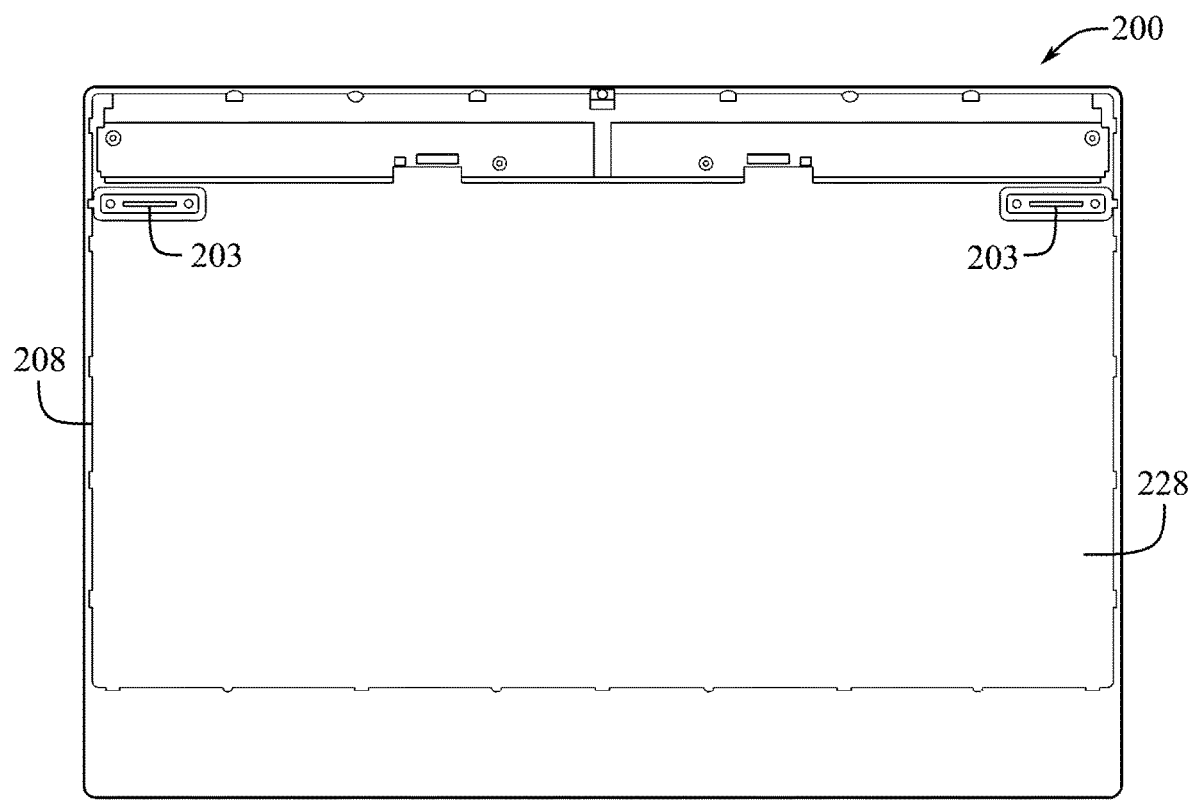
FIG. 7A shows a back view of select components of an electronic device.

FIG. 7A illustrates a cross-sectional rear view of select components of an electronic device 200. The electronic device 200 can be substantially similar to, and can include some or all of the features of the electronic device 100 described herein, such as a backplate 228. As discussed above, in some examples, the display 208 can be attached to the enclosure or housing 101 using reworkable PSA. To reduce a load that must be carried by the adhesive and reliably fix the position of the display 208 with respect to the enclosure of the device 200 along one or more axes, the electronic device 200 can include one or more retention components, such hangers, receivers, or retention components 203 that provide a hard stop for the display 208. The retention components 203 can be fixed to a rear major surface of the display 208, such as the backplate 228. Such a hard stop can be particularly useful when the electronic device includes a full cover front (i.e., no chin or lower housing portion for the cover to rest on).

Figure 7B:
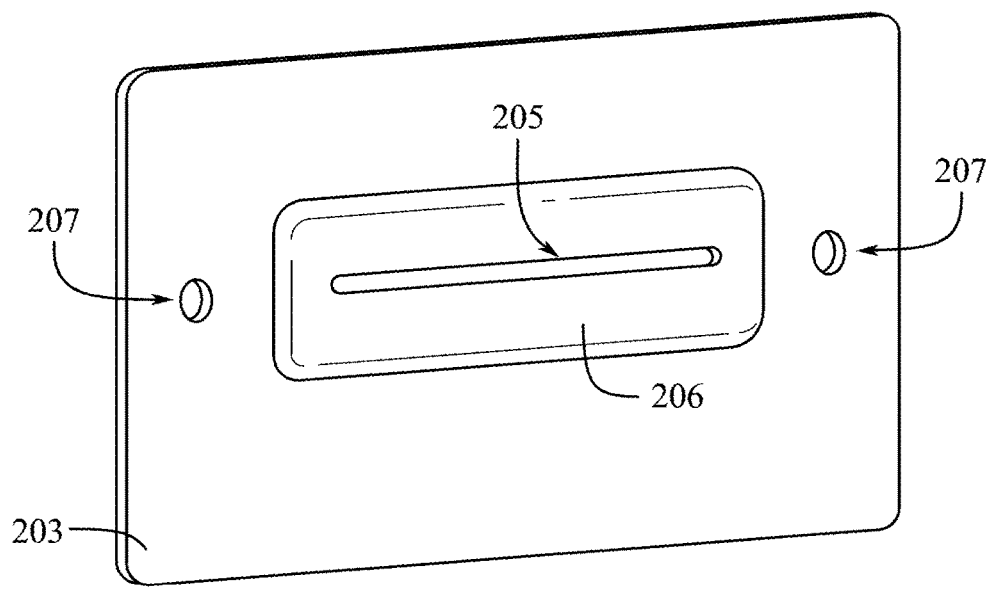
FIG. 7B shows a perspective view of a retention component of FIG. 7A.

FIG. 7B illustrates a perspective view of one of the retention components 203. The retention components 203 can aid in securing the backlight unit 213 to the housing 201 in a desired location. In some examples, the retention components 203 can be glued (e.g., by epoxy 217 in FIG. 9) or otherwise affixed to a rear side of the backplate 128 (i.e., opposite the cover assembly 211). In some examples, the retention components 203 can include metal, such as stainless steel. In some examples, the retention components 203 can include a sheet of material, such as a sheet of metal, plastic, ceramic, or combinations thereof. In some examples, the retention components 203 can include a sheet of steel or aluminum.

The retention component 203 can define a gap, a slot, or an aperture 205. In some examples, the retention component 203 can define holes or apertures 207 to receive fasteners to secure the retention components 203 to the backplate 128. The retention component 203 can include a bulge or a raised or protruding portion 206 that forms a space between the backplate 128 and the slot 205 and can at least partially define a retention volume. The raised portion 206 can be sufficiently large to enable a support component 209 (discussed in greater detail below) to be inserted through the slot 205. In some examples, the retention components 203 can serve as positional datum for the display 208. That is, the retention components 203 can serve to fix the position or the directional movement of the display 208 relative to the housing 201 along one or more axes or degrees of freedom, such as a vertical axis. For example, the retention components 203 can be useful for field repair because the retention components serve as alignment datum for reassembling the electronic device 200. Further details of the construction and architecture of the electronic device 200 are provided below with reference to FIGS. 8A and 8B.

Figure 8A:
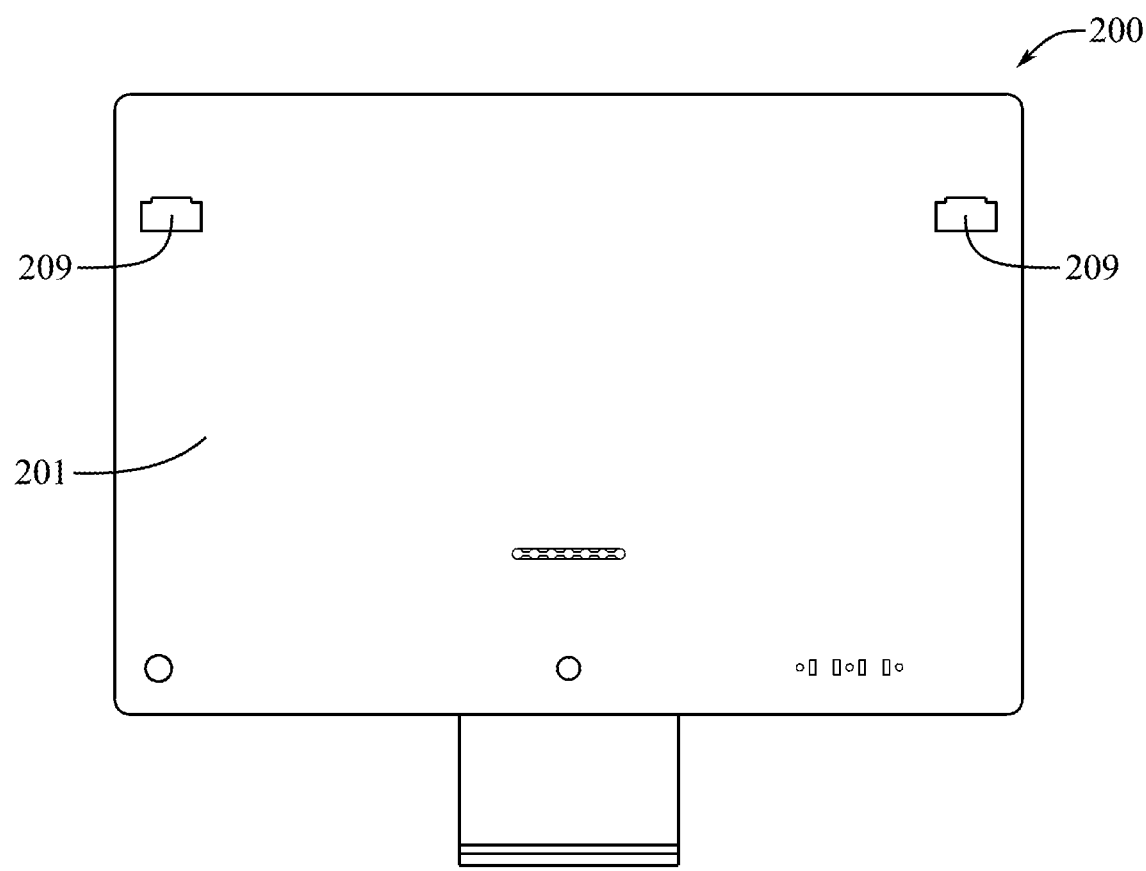
FIG. 8A shows a front view of select components of an electronic device.
Figure 8B:
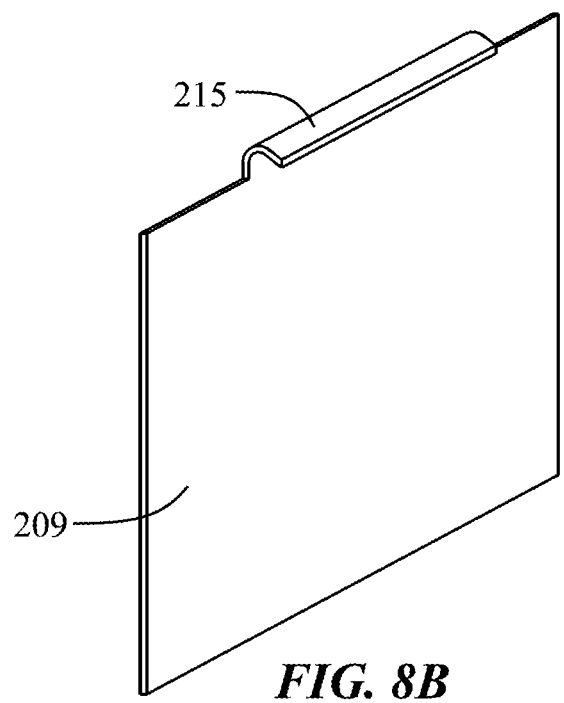
FIG. 8B shows a perspective view of a support component of FIG. 8A.

FIG. 8A illustrates a cross-sectional front view of select components of the electronic device 200. In some examples, the electronic device 200 can include one or more support components 209 that can engage with the retention components 203 to fix the position or directional movement of the display 208 in one or more directions relative to the display housing 201. FIG. 8B illustrates a perspective view of one of the support components. In some examples, the support components 209 can be glued or otherwise affixed to the housing 201, for example, a surface of the housing 201 that at least partially defines the internal volume. In some examples, the glue 217 (shown in FIG. 9) that can be used to secure the retention components 203 to the backplate 228 and the support components 209 to the housing 201 can be a high strength permanent adhesive, for instance, the glue 217 can have an adhesive shear strength that is greater than 3 MPa. In some examples, the support components 209 can include metal, such as stainless steel. In some examples, the support components 209 can include a sheet of material, such as a sheet of metal, plastic, ceramic, or combinations thereof. In some examples, the support components 209 can include a sheet of steel or aluminum. As illustrated in FIG. 8B, the support component 209 can define a tab or protruding portion 215. In some examples, the support component 209 can define holes or apertures (not shown) to receive fasteners to secure the support component 209 to the housing.

Figure 9:
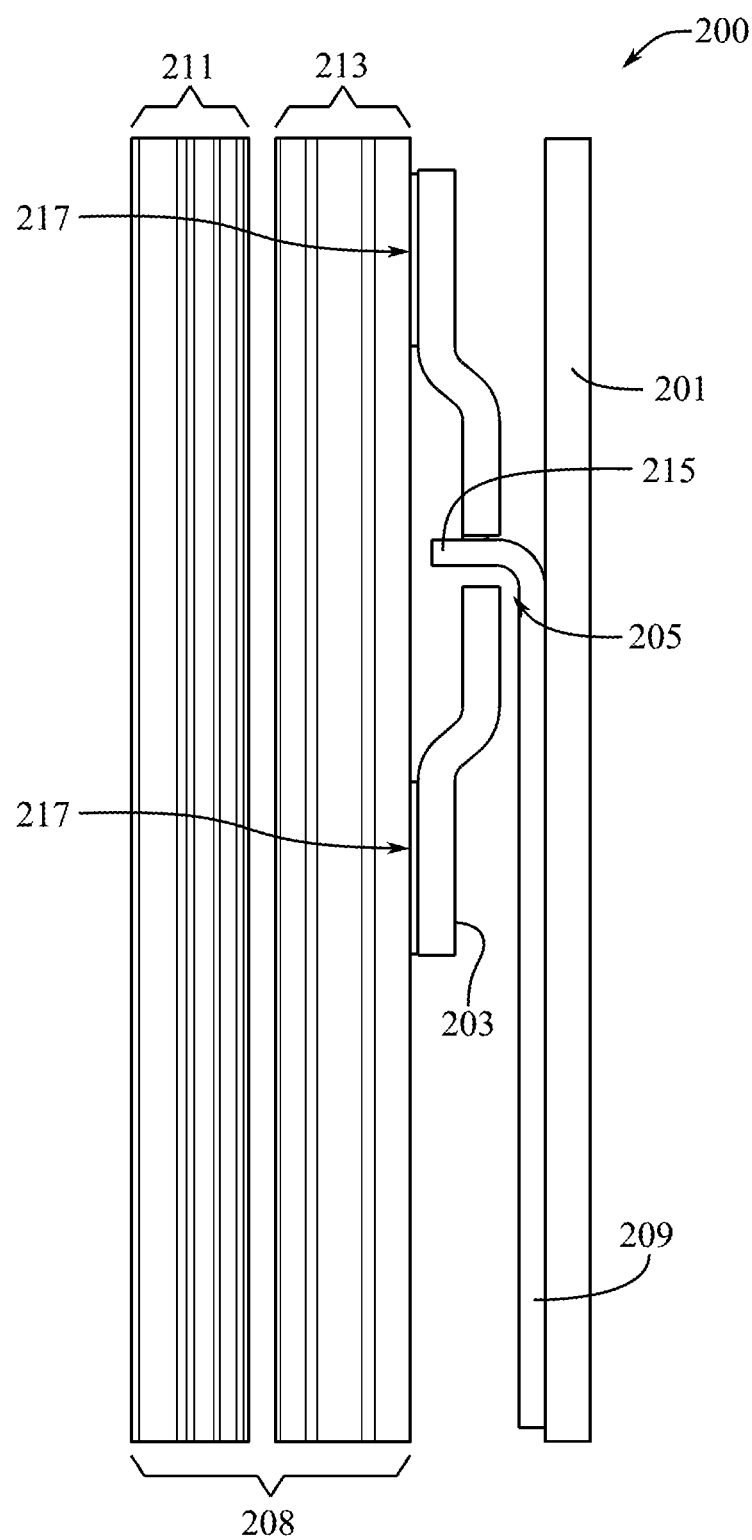
FIG. 9 shows a cross-sectional side view of a portion of the components of FIGS. 7A and 8A.

FIG. 9 illustrates a cross-sectional view of the assembled electronic device 200. The display 208 (including the cover assembly 211 and backlight unit 213) can be secured to the housing 201 by inserting the protruding portion 215 of the support component 209 at least partially into or through the slot 205 of the retention component 203. In combination with the retention components 203, the support components 209 can serve as positional datum for the display 208. For example, the retention components 203 and support components 209 can be useful for field repair because the retention components serve as alignment datum for reassembling the electronic device 200. In some examples, the connection between the retention components 203 and support components 209 can restrict relative motion between the display 208 and the housing 201 regardless of the orientation of the electronic device 200. For instance, the retention components 203 and support components 209 can function as intended when the electronic device 200 is in a landscape orientation and also when the device 200 is in a portrait orientation. It will be understood that the placement of the retention components 203 and support components 209 can be reversed. That is, in some examples, the retention components 203 can be secured to the housing 201 and the support components 209 secured to the backplate 228.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding engagement and retention features, can apply not only to the specific examples discussed herein, but to any number of embodiments in any combination. Various embodiments of electronic devices including components having various features in various arrangements are described below, with reference to FIGS. 9-11.

With the ubiquity of cameras that are integrated into personal electronic devices, there is a need for the user to be notified if and when the camera is actively operating. Thus, many electronic devices currently use indicator lights that illuminate when the camera is activated to notify the user that the camera is on. In some examples, illumination components or indicator lights can be used to provide other information to a user, as desired. Depending on the design constraints of the electronic device, however, it may not always be feasible or practical to position an LED directly behind the cover glass to provide a linear optical path therefrom.

Figure 10:
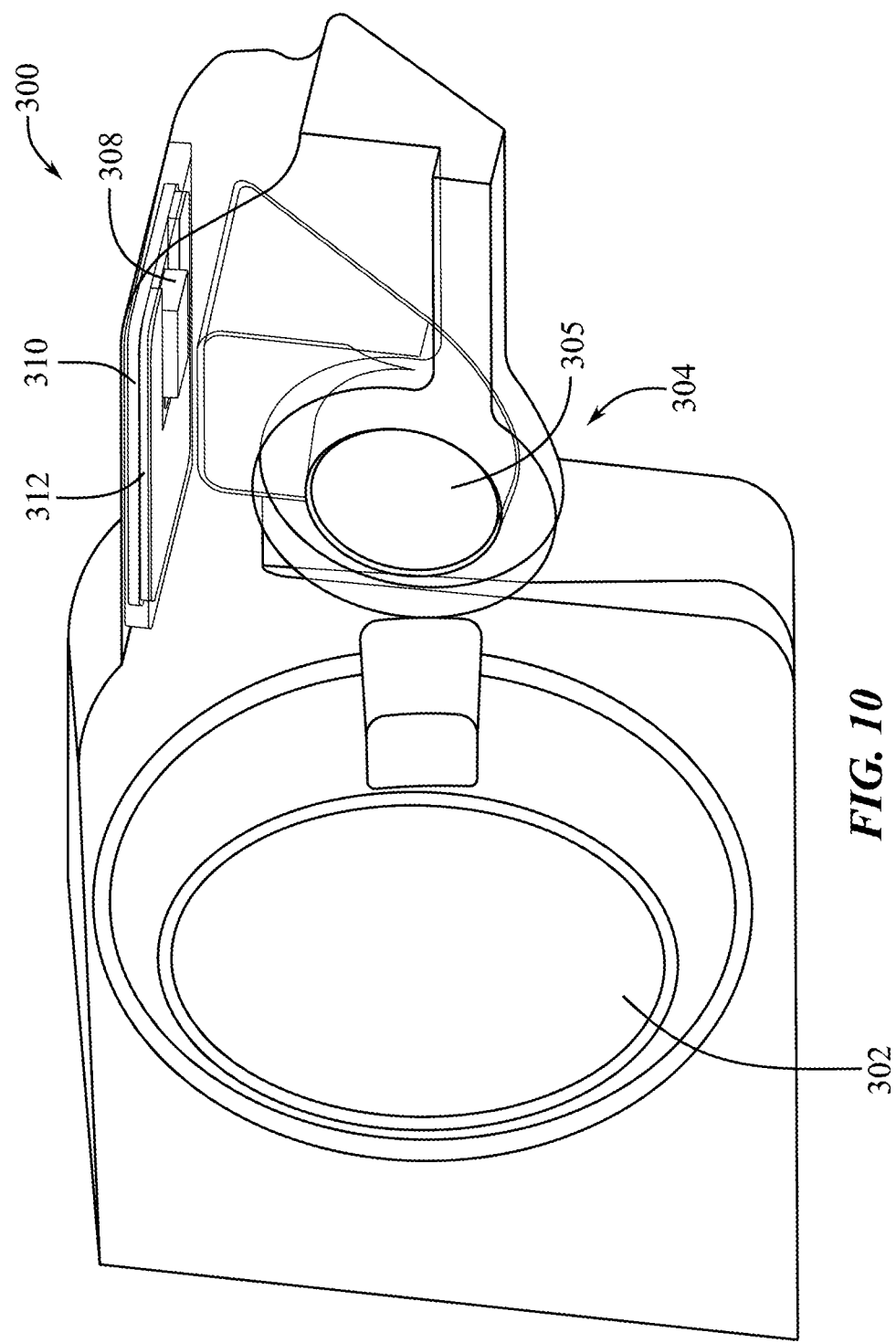
FIG. 10 shows a perspective view of an illumination component for an electronic device.
Figure 11:
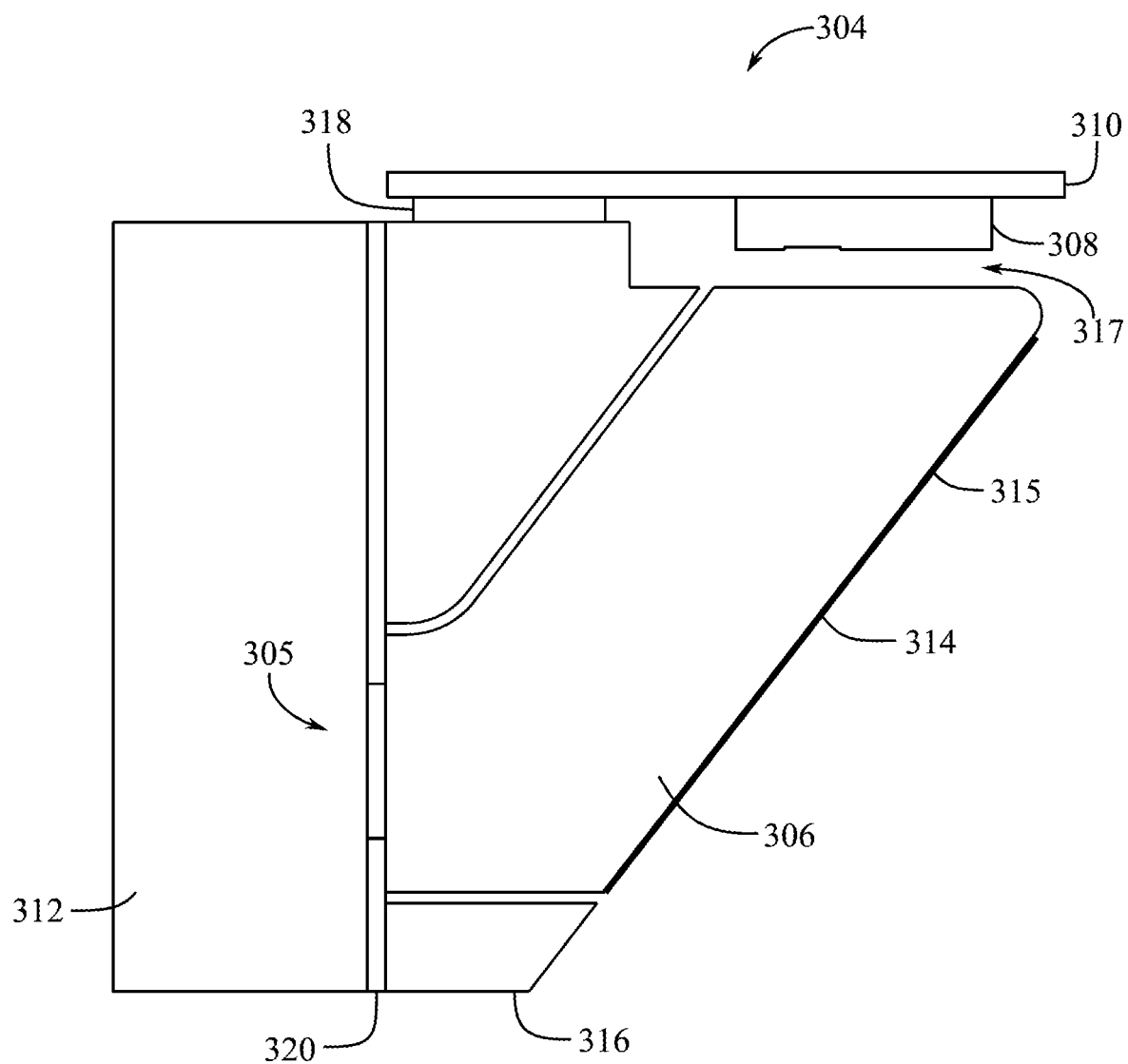
FIG. 11 shows a cross-sectional side view of the illumination component of FIG. 10.

FIG. 10 illustrates a perspective cross-sectional view of a camera module 300. FIG. 11 illustrates a cross-sectional side view of the camera module 300. The camera module 300 can be used in any number of electronic devices, such as electronic devices 100 and 200 described above. The camera module 300 can include a camera 302 and an indicator light or illumination component 304. The indicator light 304 can include an LED package 308 electrically connected to a flexible printed circuit or electrical connector 310. In some examples, the LED package 308 is oriented perpendicular to an outlet 305 of the indicator light 304. That is, the LED package 308 can emit light in a direction that is orthogonal to the direction the light is ultimately emitted through the outlet 305. The indicator light 304 can include a light guide or light pipe 306. The light guide 306 can include any transparent material as desired, such as a transparent polymer. In some examples, the light pipe 306 can include polycarbonate. In some examples, the light pipe 306 defines a light receiving surface positioned opposite the LED package 308, an angled reflection surface 314, and a light emitting surface positioned adjacent to the cover 312. In some examples, the reflection surface 314 is positioned at an acute angle relative to one or both of the light receiving surface and the light emitting surface. In some examples, the reflection surface 314 is positioned at a 45 degree angle relative to one or both of the light receiving surface and the light emitting surface. In some examples a coating 315 is applied to, deposited on, or formed on the reflection surface 314 of the light pipe 306. The coating 315 can have a high reflectance, and specifically, can be configured to be highly reflective of one or more wavelengths of light emitted by the LED package. For example, the LED package can emit green light having wavelengths between 520 nm and 560 nm and the coating 315 can have a high reflectance value for those wavelengths of light. In some examples, the coating 315 is applied by one or more vapor deposition processes, such as one or more physical vapor deposition (PVD) processes. In some examples, the coating 315 can be a mirror coating, that is the reflective coating 315 can have a reflectance in a desired range of wavelengths of light of greater than 95%, greater than 97%, greater than 98%, greater than 99%, or about 100%.

In some examples, the reflective coating 315 can be a multi-layer coating. That is, in some examples, the reflective coating 315 can include multiple layers of the same or different materials. In some examples, the reflective coating 315 can be formed from multiple layers, each deposited by a vapor deposition process. In some examples, the reflective coating 315 can include layers of ceramic material, such as one or more of silicon dioxide ($SiO_2$), titanium dioxide ($TiO_2$), zirconium oxide ($ZrO_2$), or other ceramic materials. In some examples, the reflective coating 315 can include alternating layers of different material. For example, the reflective coating 315 can include alternating layers of a first material and a second, different material. In some examples, reflective coating 315 can include alternating layers of $SiO_2$ and $TiO_2$. In some examples, the reflective coating 315 can include between 1 and 100 layers, between 5 and 50 layers, or between 10 and 30 layers, for example about 25 layers. In some examples, each layer can have a thickness of between 10 nm and 1000 nm, or between 50 nm and 500 nm, for example about 60 nm and/or about 100 nm. In some examples, the reflective coating 315 can have a total thickness of between 500 nm and 5000 nm, or between 1000 nm and 3000 nm, for example about 2000 nm. In some examples, the reflective coating 315 can have a thickness of 2078 nm.

In some examples, the light pipe 306 can be overmolded over a reflective film to produce the reflective surface necessary to redirect the light emitted from the LED package 308. The light pipe 306 can be installed and secured in place via a compression fit once additional components of the device 300 are assembled (e.g., once the backlight unit is installed). In some examples, an air gap 317 exists between the LED package 308 and the light pipe 306. In some examples, the air gap 317 between the LED package 308 and the light pipe 306 can be between 0.05 mm and 0.5 mm, or between 0.1 mm and 0.2 mm, for example about 0.15 mm. In some examples, the air gap 317 is less than 0.15 mm. In other examples, there is no air gap and the LED package 308 directly abuts or contacts the light pipe 306. In some examples, an optically clear adhesive (not shown) is positioned between the LED package 308 and the light pipe 304. The optically clear adhesive can provide additional coupling between the LED package 308 and the light pipe 304, while still allowing light to pass through substantially uninterrupted.

In some examples, the light pipe 306 is positioned in contact with a frame 316. The frame 316 can be substantially similar to the frame 116 discussed above with reference to FIGS. 4-6. In some examples, the frame 316 can define an opening or aperture to receive the light pipe 306. In some examples, the frame 316 can include an opaque polycarbonate. In some examples, the flexible printed circuit 310 is attached to the frame 316 using an adhesive 318. In some examples, an opaque ink 320 can be positioned at an interface between the cover 312 and the frame 316. The opaque ink 320 can surround the outlet 305 such that the redirected light is only emitted through the outlet 305.

Any of the features or aspects of the components discussed herein can be combined or included in any varied combination. For example, the design and shape of the frame or other device components are not limited in any way and can be formed by any number of processes, including those discussed herein. Any components can also be or form any number of additional components of an electronic device, including internal components, external components, cases, surfaces, or partial surfaces.

To the extent applicable to the present technology, gathering and use of data available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data can be used to provide insights into a user's general wellness, or can be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data can be governed by federal and/or state laws, such as the Health Insurance Portability and Accountability Act (HIPAA); whereas health data in other countries can be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification can be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
a housing at least partially defining an exterior surface and an internal volume of the electronic device;
a display assembly at least partially disposed in the internal volume, the display assembly comprising:
a transparent cover at least partially defining the exterior surface of the electronic device;
a backlight unit disposed between the transparent cover and the housing;
a frame coupling the transparent cover to the backlight unit, the frame comprising members that at least partially define an aperture, a member defining a component aperture; and
an electronic component disposed in the internal volume and extending through the component aperture;
wherein the frame directly contacts the transparent cover.

2. The electronic device of claim 1, wherein the backlight unit further comprises a mounting component coupled to the frame, the mounting component further defining the component aperture.

3. The electronic device of claim 2, wherein the frame defines a retention feature to receive an attachment component, the attachment component coupling the mounting component to the frame.

4. The electronic device of claim 1, wherein the electronic component comprises a flexible electrical connector.

5. The electronic device of claim 1, wherein a surface of the frame at least partially defining the component aperture is angled relative to the exterior surface defined by the transparent cover.

6. The electronic device of claim 1, wherein:
the frame defines a notch; and
the transparent cover is secured to the frame with an adhesive positioned in the notch.

7. The electronic device of claim 6, wherein the adhesive comprises a reworkable pressure sensitive adhesive.

8. The electronic device of claim 1, wherein the frame comprises a glass-filled polymer.

9. The electronic device of claim 1, wherein the frame extends around a periphery of the transparent cover.

10. The electronic device of claim 1, wherein the frame comprises a continuous ring.

11. The electronic device of claim 1, wherein the frame at least partially defines a seal between the transparent cover and the backlight unit.

12. An electronic device, comprising:
an enclosure at least partially defining an exterior surface, an interior surface, and an internal volume of the electronic device;
a display assembly at least partially disposed in the internal volume;
a support component attached to the interior surface that at least partially defines the internal volume; and
a retention component attached to the display assembly, the retention component comprising a protruding portion that at least partially defines a retention volume and an aperture in communication with the retention volume;
the support component at least partially disposed through the aperture and in the retention volume fixing a directional movement of the display assembly relative to the enclosure.

13. The electronic device of claim 12, wherein:
the support component comprises a first support component and the retention component comprises a first retention component; and
the electronic device further comprises a second support component attached to the interior surface and a second retention component attached to the display assembly, the second support component at least partially disposed in an aperture defined by the second retention component.

14. The electronic device of claim 12, wherein the retention component is attached to a backlight unit of the display assembly.

15. An illumination component, comprising:
an LED package;
a light pipe defining:
a light receiving surface positioned opposite the LED package;
a light emitting surface positioned perpendicular to the light receiving surface; and
a reflection surface positioned at an acute angle relative to the light receiving surface and the light emitting surface; and
a multi-layer reflective coating deposited on the reflection surface.

16. The illumination component of claim 15, wherein the multi-layer reflective coating is formed by a vapor deposition process.

17. The illumination component of claim 15, wherein the multi-layer reflective coating comprises alternating titanium dioxide layers and silicon dioxide layers.

18. The illumination component of claim 15, wherein the reflective coating has a thickness of between 1000 nm and 3000 nm.

19. The illumination component of claim 15, wherein the LED package is spaced apart from the light receiving surface by between 0.1 mm and 0.2 mm.

\* \* \* \* \*